(12) United States Patent
Huguley

(10) Patent No.: US 8,807,578 B1
(45) Date of Patent: Aug. 19, 2014

(54) GERM BARRIER FOR SHOPPING CART

(76) Inventor: Jerome Huguley, College Park, GA (US)

( * ) Notice: Subject to any disclaimer, the term of this patent is extended or adjusted under 35 U.S.C. 154(b) by 96 days.

(21) Appl. No.: 13/448,766

(22) Filed: Apr. 17, 2012

(51) Int. Cl.
*B62B 3/02* (2006.01)

(52) U.S. Cl.
USPC .................................................. 280/33.992

(58) Field of Classification Search
USPC ............. 280/33.991–33.993, 33.995, 33.997, 280/DIG. 4; 297/219.12, 256.17; 150/154
See application file for complete search history.

(56) References Cited

U.S. PATENT DOCUMENTS

| | | | | |
|---|---|---|---|---|
| 2,797,743 | A * | 7/1957 | Rodtz, Jr. ....................... | 297/229 |
| 2,917,094 | A * | 12/1959 | Sullivan ......................... | 150/166 |
| 3,028,066 | A * | 4/1962 | Bumby ........................... | 220/23.9 |
| 3,578,380 | A * | 5/1971 | Jacobus ......................... | 297/229 |
| 4,960,302 | A | 10/1990 | Walters | |
| 5,238,293 | A * | 8/1993 | Gibson .......................... | 297/229 |
| 5,271,634 | A | 12/1993 | Walton | |
| 5,829,835 | A * | 11/1998 | Rogers et al. ............. | 297/256.17 |
| 5,915,723 | A * | 6/1999 | Austin .......................... | 280/651 |
| 6,237,998 | B1 * | 5/2001 | Aprile ...................... | 297/219.12 |
| 6,428,098 | B1 * | 8/2002 | Allbaugh ................. | 297/219.12 |
| 6,491,996 | B2 * | 12/2002 | Digangi ........................... | 428/43 |
| 6,517,155 | B1 * | 2/2003 | Landine .................... | 297/256.17 |
| 6,669,289 | B1 * | 12/2003 | Hays ........................ | 297/256.17 |
| 6,702,381 | B2 * | 3/2004 | Endicott et al. .......... | 297/256.17 |
| 6,848,743 | B1 * | 2/2005 | Collins .................... | 297/256.17 |
| 6,948,725 | B2 * | 9/2005 | Sampson et al. .......... | 280/33.993 |
| 7,100,982 | B2 * | 9/2006 | Lundgren ................. | 297/256.17 |
| 7,270,338 | B1 | 9/2007 | Edgar | |
| 7,374,182 | B2 * | 5/2008 | Gurley et al. ............ | 280/33.993 |
| 7,398,977 | B2 * | 7/2008 | Short ....................... | 280/33.992 |
| D633,683 | S * | 3/2011 | Parness .......................... | D34/27 |
| 8,042,869 | B2 * | 10/2011 | McClintock et al. ..... | 297/219.12 |
| 8,172,239 | B1 * | 5/2012 | Boyd et al. ............... | 280/33.992 |
| D677,851 | S * | 3/2013 | Harris ............................ | D34/27 |
| 2006/0181062 | A1 * | 8/2006 | Robinson ....................... | 280/639 |
| 2007/0152410 | A1 * | 7/2007 | Clark et al. .............. | 280/33.992 |
| 2008/0258528 | A1 * | 10/2008 | Bush et al. ............... | 297/256.17 |
| 2009/0102148 | A1 | 4/2009 | Bruner | |
| 2010/0001480 | A1 * | 1/2010 | Forde ....................... | 280/33.992 |

* cited by examiner

*Primary Examiner* — Katy M Ebner
(74) *Attorney, Agent, or Firm* — Crossley Patent Law; Micah C. Gunn

(57) ABSTRACT

A germ barrier for shopping cart including a sheet removably insertable into an extant shopping cart whereby items placed in the shopping cart are prevented from contacting the interior of the shopping cart.

6 Claims, 3 Drawing Sheets

GERM BARRIER FOR SHOPPING CART

BACKGROUND OF THE INVENTION

Various types of covers for shopping carts are known in the prior art. However, what is needed is a germ barrier for shopping cart that is removably insertable into an extant shopping cart that includes a sheet configured to overlie the interior of the shopping cart to prevent contact between the shopping cart and items placed thereinto.

FIELD OF THE INVENTION

The present invention relates to a germ barrier for shopping cart, and more particularly, to a germ barrier for shopping cart that is removably insertable into an extant shopping cart that includes a sheet configured to overlie the interior of the shopping cart to prevent contact between the shopping cart and items placed thereinto.

SUMMARY OF THE INVENTION

The general purpose of the germ barrier for shopping cart, described subsequently in greater detail, is to provide a germ barrier for shopping cart which has many novel features that result in a germ barrier for shopping cart which is not anticipated, rendered obvious, suggested, or even implied by prior art, either alone or in combination thereof.

The present invention has been devised to enable a shopper to place items in an extant shopping cart without the items contacting the shopping cart, and thereby increase hygiene by preventing the spread of germs to foodstuffs and other items procured while shopping. Shopping carts are reused many times in a single day, and many foreign objects—potentially vectors for countless germs and microbes—are repeatedly introduced thereinto. A means of shielding items placed into a shopping cart from potential pathogens is warranted, to decrease the spread of germs across human populations.

The present invention, then, is a germ barrier for shopping cart including a sheet configured to removably insert into a shopping cart and cover an interior of the shopping cart. The sheet includes a bottom section configured to overlie a bottom of said cart interior, a front section configured to overlie a front of said cart interior, a rear section configured to cover the rear of said cart interior, and a pair of side sections configured to cover each of a pair of sides of a shopping cart interior. An upper edge is disposed perimetrically around the sheet, said upper edge configured to overlie the top of the shopping cart front, rear, and pair of sides.

A pair of front corners is disposed on the upper edge of the front section, each of the pair of front corners proximal to each of the pair of side sections. A pair of cut-away corners is disposed upon the upper edge of the rear section, each of the pair of cut-away corners disposed proximal to each of the pair of side sections. Each of the pair of cut-away corners is configured to conform around a handle bar of the shopping cart. A pair of drawstrings is disposed upon each of the pair of front corners and each of the pair of cut-away corners wherein the sheet is releasably attachable to the shopping cart.

The present invention is considered with the sheet manufactured from a polymeric material, as a disposable germ barrier for shopping cart, engendering single-use when shopping. This disposable embodiment is considered for use by a store, to provide a germ barrier for shopping cart to each shopper when selecting a cart for shopping. An alternate embodiment is considered made of fabric, or a more durable polymeric material, as desired, rendering a reusable germ barrier for shopping cart; and an individual may reuse said germ barrier for shopping cart and launder or clean the germ barrier for shopping cart, as desired, between uses.

Thus has been broadly outlined the more important features of the present germ barrier for shopping cart so that the detailed description thereof that follows may be better understood and in order that the present contribution to the art may be better appreciated.

Objects of the present germ barrier for shopping cart, along with various novel features that characterize the invention are particularly pointed out in the claims forming a part of this disclosure. For better understanding of the germ barrier for shopping cart, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
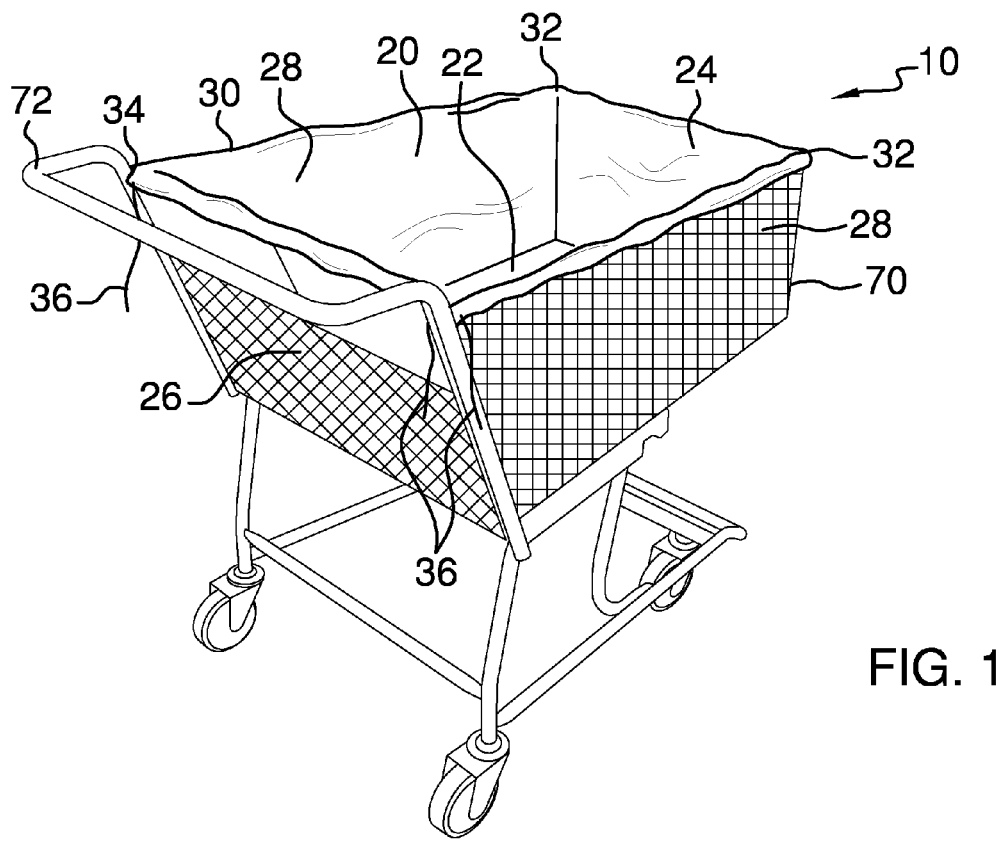
FIG. 1 is an isometric view.
Figure 2:
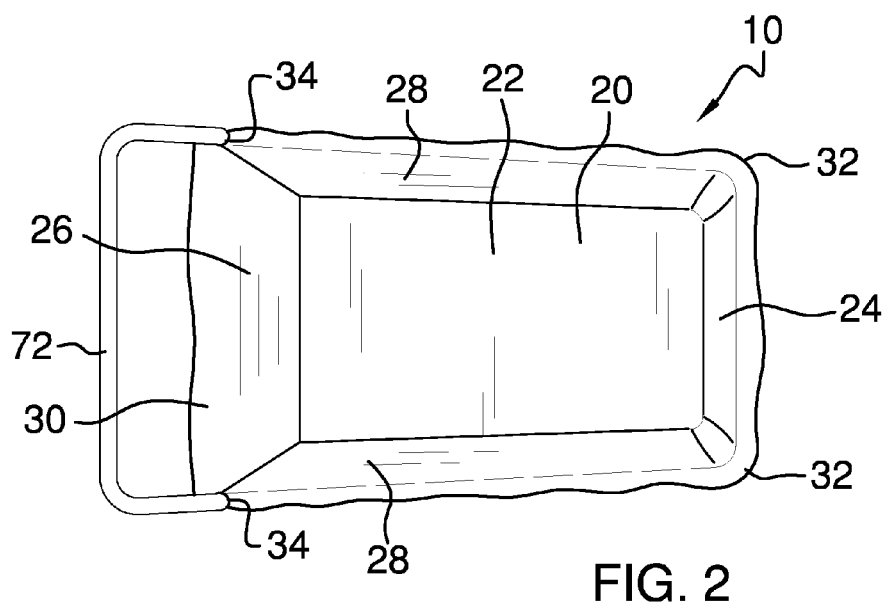
FIG. 2 is a top view.
Figure 3:
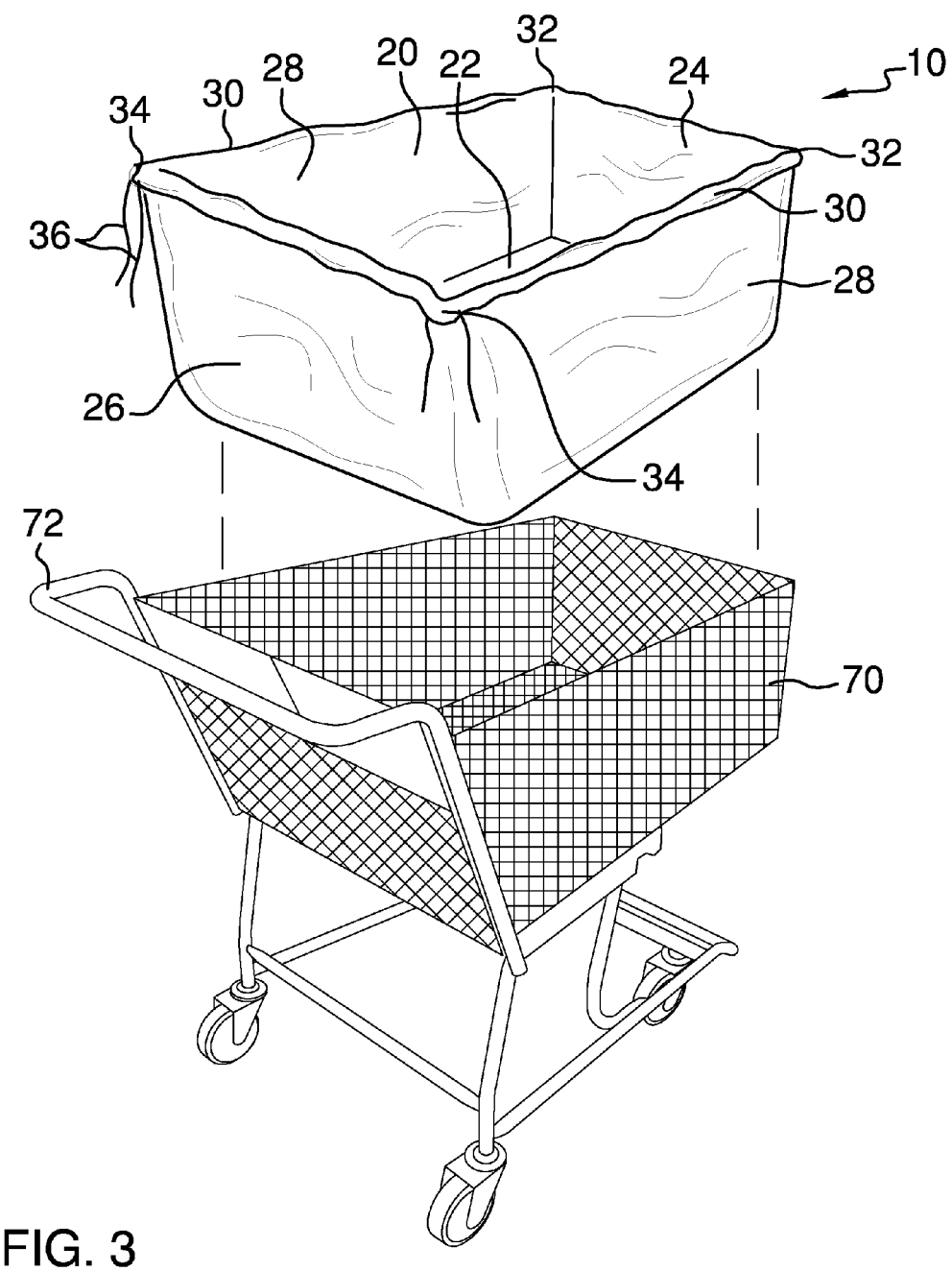
FIG. 3 is an exploded view.
Figure 4:
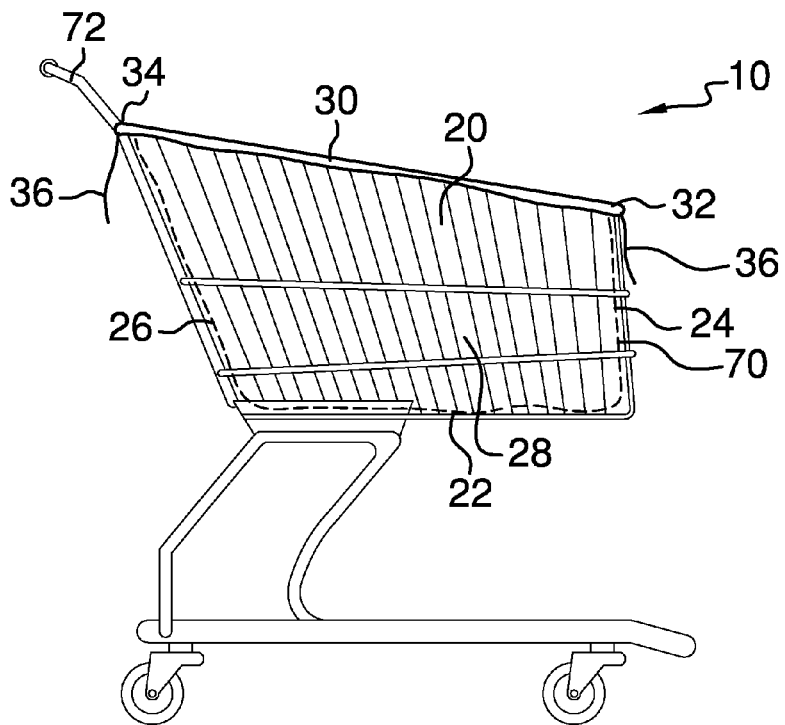
FIG. 4 is a side view.
Figure 5:
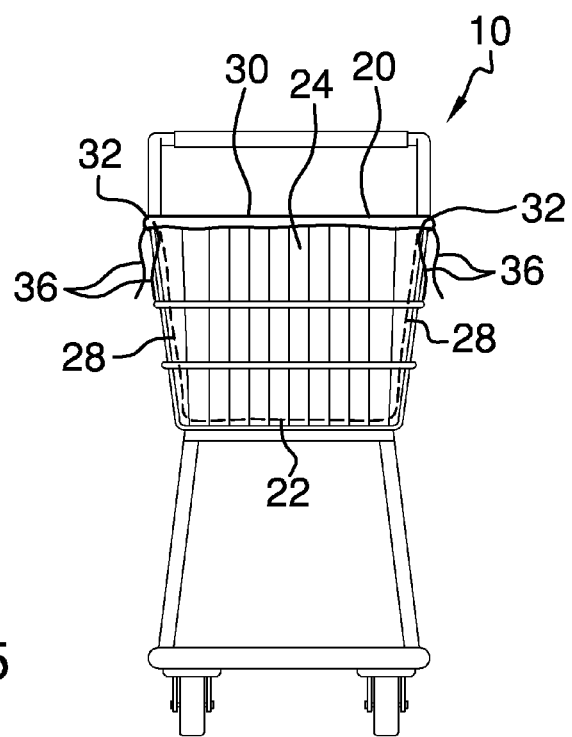
FIG. 5 is a front view.

With reference now to the drawings, and in particular FIGS. 1 through 5 thereof, example of the instant germ barrier for shopping cart employing the principles and concepts of the present germ barrier for shopping cart and generally designated by the reference number 10 will be described.

Referring to FIGS. 1 through 5 a preferred embodiment of the present germ barrier for shopping cart 10 is illustrated.

The germ barrier for shopping cart 10 includes a flexible sheet 20 configured to removably insert into an extant shopping cart 70. The sheet 20 is configured to cover the interior of the shopping cart 70 to prevent items placed in the shopping cart 70 from contacting the shopping cart 70 and provides a sanitary means for shoppers purchasing food and other items while using a shopping cart.

The sheet has a bottom section 22 configured to overlie a bottom of the shopping cart 70 interior, a front section 24 configured to overlie a front side of the shopping cart 70 interior, a rear section 26 configured to overlie a rear side of the shopping cart 70 interior, a pair of side sections 28 configured to overlie each of a pair of sides of the shopping cart 70 interior, and an upper edge 30 configured to overlie a perimeter of a top of the shopping cart 70 interior.

The upper edge 30 has a pair of front corners 32 disposed upon the front section 24 proximal to each of the pair of side sections 28 and a pair of cut-away corners 34 disposed upon the rear section 26 proximal to each of the pair of side sections 28. Each of the pair of cut-away corners 34 is configured to conform around a handle bar 72 disposed on the shopping cart 70. A pair of drawstrings 36 is disposed proximal to each of the pair of front corners 32 and each of the pair of cut-away corners 34 wherein the sheet 20 is releasably attachable to the shopping cart 70.

The germ barrier for shopping cart 10 is envisioned to be made of a polymeric material and alternately to be made of a launderable fabric. The germ barrier for shopping cart 10 may therefore be disposable, and configured for one-time use while shopping. This disposable embodiment is considered for use by a store desiring to provide a sanitary means for shoppers using shopping carts 70, and may be available for each customer to use, as desired. Alternately, reusable embodiments are considered, wherein the germ barrier for shopping cart 10 may be reused by an individual, and carried to a store for use and laundered or cleaned, as desired, between uses. The reusable embodiment of the present germ barrier for shopping cart 10 may be manufactured from a more durable polymeric material or alternately from a fabric material.

What is claimed is:

1. A germ barrier for shopping cart comprising:
    a flexible sheet configured to removably insert into an extant shopping cart, said sheet configured to cover the interior of the shopping cart when said sheet is in an inserted position;
    wherein the sheet is releasably attachable to the shopping cart and items placed within the shopping cart are prevented from contact with the shopping cart when said sheet is in an inserted position;
    said sheet comprising a bottom section, a front section, a rear section, a pair of side sections, an upper edge, a pair of front corners disposed atop the front section proximal each of the pair of side sections, and a pair of cut-away corners disposed in the upper edge of the rear section proximal to each of the pair of side sections;
    wherein when said sheet is in the inserted position,
    said bottom section overlies a bottom of the shopping cart interior;
    said front section overlies a front side of the shopping cart interior;
    said rear section overlies a rear side of the shopping cart interior;
    said pair of side sections overlies each of a pair of sides of the shopping cart interior;
    said upper edge overlies a perimeter of a top of the shopping cart interior; and
    each of the pair of cut-away corners conforms to each of a pair of handle bars disposed on the shopping cart.

2. The germ barrier for shopping cart of claim 1 wherein a pair of drawstrings is disposed proximal to each of the pair of cut-away corners and each of the pair of front corners whereby the sheet is releasably attachable to the shopping cart.

3. The germ barrier for shopping cart of claim 2 wherein the sheet is made of a polymeric material.

4. The germ barrier for shopping cart of claim 2 wherein the sheet is made of a launderable fabric.

5. A germ barrier for shopping cart comprising consisting of:
    a flexible polymeric sheet configured to removably insert into an extant shopping cart, said sheet configured to cover the interior of the shopping cart to prevent items placed in the shopping cart from contacting the shopping cart when said sheet is in an inserted position, the sheet having a bottom section, a front section, a rear section, a pair of side sections, an upper edge, a pair of front corners disposed atop the front section proximal each of the pair of side sections, and a pair of cut-away corners disposed in the upper edge of the rear section proximal to each of the pair of side sections, wherein when said sheet is in said inserted position, said bottom section overlies a bottom of the shopping cart interior, said front section overlies a front side of the shopping cart interior, said rear section overlies a rear side of the shopping cart interior, said pair of side sections overlies each of a pair of sides of the shopping cart interior, said upper edge overlies a perimeter of a top of the shopping cart interior, and each of the pair of cut-away corners conforms to a handle bar disposed on the shopping cart; and
    a pair of drawstrings disposed proximal to each of the pair of front corners and each of the pair of cut-away corners whereby the sheet is releasably attachable to the shopping cart.

6. A germ barrier for shopping cart comprising consisting of:
    a flexible launderable sheet configured to removably insert into an extant shopping cart, said sheet configured to cover the interior of the shopping cart to prevent items placed in the shopping cart from contacting the shopping cart when said sheet is in an inserted position, the sheet having a bottom section, a front section, a rear section, a pair of side sections, an upper edge, a pair of front corners disposed atop the front section proximal each of the pair of side sections, and a pair of cut-away corners disposed in the upper edge of the rear section proximal to each of the pair of side sections, wherein when said sheet is in said inserted position, said bottom section overlies a bottom of the shopping cart interior, said front section overlies a front side of the shopping cart interior, said rear section overlies a rear side of the shopping cart interior, said pair of side sections overlies each of a pair of sides of the shopping cart interior, said upper edge overlies a perimeter of a top of the shopping cart interior, and each of the pair of cut-away corners conforms to a handle bar disposed on the shopping cart; and
    a pair of drawstrings disposed proximal to each of the pair of front corners and each of the pair of cut-away corners whereby the sheet is releasably attachable to the shopping cart.

* * * * *